(12) United States Patent
Nadeau et al.

(10) Patent No.: US 7,839,847 B2
(45) Date of Patent: Nov. 23, 2010

(54) METHODS AND APPARATUS PROVIDING VPN TRAFFIC MATRIX CONSTRUCTION

(75) Inventors: Thomas D. Nadeau, Hampton, NH (US); Sumit Mukhopadhyay, Shrewsbury, MA (US); Stephen Paul Elias, Amherst, NH (US); Adrien Michael Grise, Dracut, MA (US)

(73) Assignee: Cisco Technology, Inc., San Jose, CA (US)

( * ) Notice: Subject to any disclaimer, the term of this patent is extended or adjusted under 35 U.S.C. 154(b) by 875 days.

(21) Appl. No.: 11/430,208

(22) Filed: May 8, 2006

(65) Prior Publication Data

US 2007/0258372 A1 Nov. 8, 2007

(51) Int. Cl.
H04L 12/28 (2006.01)
(52) U.S. Cl. .............. 370/389; 370/395.5; 370/469
(58) Field of Classification Search ............ 370/351, 370/389, 392, 400, 401, 412, 428, 395.5, 370/469
See application file for complete search history.

(56) References Cited

U.S. PATENT DOCUMENTS 6,330,236 B1 * 12/2001 Ofek et al. .............. 370/369
6,725,263 B1 * 4/2004 Torres ..................... 709/223
7,185,103 B1 * 2/2007 Jain ........................ 709/234
2003/0128688 A1 * 7/2003 Kim ........................ 370/351

OTHER PUBLICATIONS

Cisco CNS Netflow Collection Engine Customizing FlowCollector, dated 2004, Cisco, pp. 1-21, www.cisco.com.
NetFlow Services for an Enterprise Network, May 19, 2005, Cisco, pp. 1-52, www.cisco.com.
CNS NetFlow Collection Engine Advanced Features, dated 2004, Cisco, pp. 1-12, www.cisco.com.

* cited by examiner

*Primary Examiner*—Nittaya Juntima
*Assistant Examiner*—Mon Cheri S Davenport
(74) *Attorney, Agent, or Firm*—Brinks Hofer Gilson & Lione

(57) ABSTRACT

A system receives a packet at a router, and pushes a label onto a label stack. The label stack is associated with the packet. The system provides a forwarding record containing label bindings for the router, and transmits the forwarding record to a collector. A system receives a forwarding record from a router. The system compares a first record entry type of the forwarding record with a second record entry type of the forwarding record to determine the traffic flow in the network. The system then maps the traffic flow in the network, based on a result of the comparing.

10 Claims, 8 Drawing Sheets

204 PROVIDE A SECOND FORWARDING RECORD, CONTAINING LABEL BINDING FOR A SECOND ROUTER, TO THE COLLECTOR, THE SECOND FORWARDING RECORD PROVIDED BY THE SECOND ROUTER, THE SECOND ROUTER IN COMMUNICATION WITH THE FIRST ROUTER

205 DETERMINE THE SECOND FORWARDING RECORD PROVIDED BY THE SECOND ROUTER CONTAINS INFORMATION NOT INCLUDED IN THE FIRST FORWARDING RECORD PROVIDED BY THE FIRST ROUTER

OR

206 DETERMINE THE SECOND FORWARDING RECORD PROVIDED BY THE SECOND ROUTER INCLUDES INFORMATION INCLUDED IN THE FIRST FORWARDING RECORD PROVIDED BY THE FIRST ROUTER

*FIG. 3*

213 COMPARE A FIRST RECORD ENTRY TYPE OF THE FORWARDING RECORD WITH A SECOND RECORD ENTRY TYPE OF THE FORWARDING RECORD TO DETERMINE THE TRAFFIC FLOW IN THE NETWORK

214 COMPARE A FIRST DATA FIELD OF THE FIRST RECORD ENTRY TYPE WITH A FIRST DATA FIELD OF THE SECOND RECORD ENTRY TYPE

215 DETERMINE THE FIRST DATA FIELD OF THE FIRST RECORD ENTRY TYPE MATCHES WITH A FIRST DATA FIELD OF THE SECOND RECORD ENTRY TYPE

216 USE A SECOND DATA FIELD OF THE SECOND RECORD ENTRY TYPE TO DETERMINE AN IDENTIFIER ASSOCIATED WITH A VIRTUAL PRIVATE NETWORK

OR

217 USE A THIRD DATA FIELD OF THE SECOND RECORD ENTRY TYPE TO DETERMINE A DIRECTION IN WHICH A PACKET ASSOCIATED WITH THE ROUTER IS TRAVELING

*FIG. 5*

218 MAP THE TRAFFIC FLOW IN THE NETWORK, BASED ON A RESULT OF THE COMPARING

219 DETERMINE A SEQUENCE OF THE TRAFFIC FLOW ON THE NETWORK BASED ON AT LEAST ONE DATA FIELD IN THE FIRST RECORD ENTRY TYPE IN CONJUNCTION WITH AT LEAST ONE DATA FIELD FROM THE SECOND RECORD ENTRY TYPE

220 INTEGRATE THE FIRST RECORD ENTRY TYPE AND THE SECOND RECORD ENTRY TYPE INTO THE SEQUENCE BASED ON THE TIME STAMP ASSOCIATED WITH THE FIRST RECORD ENTRY TYPE AND THE TIME STAMP ASSOCIATED WITH THE SECOND RECORD ENTRY TYPE

*FIG. 6*

> 227 MAP THE TRAFFIC FLOW IN THE NETWORK, BASED ON A RESULT OF THE COMPARING
>
>> 228 MAP A TRAFFIC FLOW OF AT LEAST ONE ROUTER WITHIN THE NETWORK
>
>> OR
>
>> 229 MAP A TRAFFIC FLOW OF AT LEAST ONE VIRTUAL ROUTING AND FORWARDING TABLE WITHIN THE NETWORK

*FIG. 8*

METHODS AND APPARATUS PROVIDING VPN TRAFFIC MATRIX CONSTRUCTION

BACKGROUND

The Internet is a massive network of networks in which computers communicate with each other via use of different communication protocols. The Internet includes packet-routing devices, such as switches, routers and the like, interconnecting many computer devices. To support routing of information such as packets, each of the packet-routing devices typically maintains routing tables to perform routing decisions in which to forward traffic from a source computer, through the network, to a destination computer.

Virtual Private Networks (VPNs) are becoming an increasingly popular mechanism to interconnect multiple remote sites of a common entity, such as a corporation, university, governmental institution, or other enterprise. A VPN allows remote sites to interconnect as if co-located by providing message transport, security, and node addressing. Such a VPN interconnects multiple sub networks, or local area networks (LANs), of an enterprise such as a corporation, university, or distributor, for example. The sub networks, in turn, interconnect with each other via a public access network such as the Internet. Such a sub network interconnection is typically known as a core network, and includes service providers having a high-speed backbone of routers and trunk lines. Each of the sub networks and the core networks has entry points known as edge routers, through which traffic entering and exiting from the network flows. The core network has ingress/egress points handled by nodes known as provider edge (PE) routers, while the sub networks have ingress/egress points known as customer edge (CE) routers, discussed further in Internet Engineering Task Force (IETF) RFC 2547bis, concerning Virtual Private Networks (VPNs).

An interconnection between the sub networks of a VPN, therefore, typically includes one or more core networks. Each of the core networks is usually one or many autonomous systems (AS), meaning that it employs and enforces a common routing policy among the nodes (routers) included therein. Accordingly, the nodes of the core networks often employ a protocol operable to provide high-volume transport with path based routing, meaning that the protocol not only specifies a destination (as in TCP/IP), thus, the protocol does not merely specify a destination, as in TCP/IP; it implements an addressing strategy that allows for unique identification of end points, and also allows specification of a particular routing path through the core network. One such protocol is the Multi-protocol Label Switching (MPLS) protocol, defined in Internet Engineering Task Force (IETF) RFC 3031. MPLS is a protocol that combines the label-based forwarding of ATM networks, with the packet-based forwarding of IP networks and then builds applications upon this infrastructure.

Traditional MPLS, and more recently Generalized MPLS (G-MPLS) networks as well, extend the suite of IP protocols to expedite the forwarding scheme used by conventional IP routers, particularly through core networks employed by service providers (as opposed to end-user connections or taps). Routers, to date, have used complex and time-consuming route lookups and address matching schemes to determine the next hop for a received packet, primarily by examining the destination address in the header of the packet. MPLS has greatly simplified this operation by basing the forwarding decision on a simple label stack. Another major feature of MPLS is its ability to place IP traffic on an explicitly defined path through the network. Such path specification capability is generally not available with conventional IP traffic. In this way, MPLS provides bandwidth guarantees and other differentiated service features for a specific user application (or flow). Current IP-based MPLS networks are emerging for providing advanced services such as bandwidth-based guaranteed service, priority-based bandwidth allocation, and pre-emption services.

For each specific service, a table for a forwarding equivalence class (FEC) is created to represent a group of flows with the same traffic-engineering requirements. A specific label is then bound to a FEC. At the ingress of an MPLS network, incoming IP packets are examined and assigned a "label" by a label edge router (LER). The labeled packets are then forwarded along an LSP, where each label-switching router (LSR) makes a switching decision based on the contents of a packet's MPLS shim header. Such LSRs avoid examining the IP headers of the packets to find an output port (next hop). In one example configuration, a LSR simply strips off the existing label and applies a new label for the next hop. The label information base (LIB) provides an outgoing label (to be inserted into the packet) and an outgoing interface (based on an incoming label on an incoming interface).

Therefore, MPLS uses a technique called label switching (or swapping or popping) as a means to transport data across a network. The routers within an MPLS network that are responsible for label processing are known as Label Switching Routers (LSRs), and the path followed by data is known as a Label Switched Path (LSP). Upon entry to an MPLS network, such as from a CE router via a PE router, an MPLS-specific header is inserted at the front of each packet to in effect, re-encapsulate it. The MPLS header contains a stack of labels—one or more—that uniquely identify the switching path between any two LSRs. This label tells adjacent switching nodes how to process and forward the data. As a node receives each packet, it may push a new label onto the stack of a packet before forwarding it on, pop one from the stack, or swap one or more of the labels with new ones. The path of the packet through the network is defined by its initial labeling. Accordingly, the subsequent mapping of labels is consistent at each node so as to form a complete label switched path between the ingress to and the egress from the MPLS network.

Netflow allows for granular and accurate traffic flow measurements by recording network traffic into the device cache. Since network traffic has a flow based nature to it, the Net-Flow accounting data that is built in the cache, characterizes the IP traffic being forwarded. NetFlow data records exported by routers and switches consist of active traffic flows with detailed traffic statistics. These flows contain information about source and destination IP addresses along with the protocols and ports used in the end-to-end conversation. This exported NetFlow data is collected and analyzed by NetFlow Analyzer to generate reports on top hosts, top applications, and top conversations using bandwidth in your network. NetFlow combined with NetFlow Analyzer yields valuable information about the behavior of traffic on your network. Armed with this information, it is easier to make critical decisions on bandwidth capacity, security, and optimal usage of network infrastructure.

SUMMARY

Conventional technologies for tracking traffic flow in an MPLS network suffer from a variety of deficiencies. In particular, conventional technologies for tracking traffic flows in an MPLS network are limited in that identification of packet counts and MPLS label attributes for MPLS packet flows is not available on every router in a network. Generally, it is a requirement that both the label export and traffic be exported from the same router. In a network where one or more PE routers are connected to a CE router (i.e., a cascaded PE configuration), the information between the multiple PE routers is aggregated and the granularity between the multiple PE routers is lost.

Embodiments disclosed herein significantly overcome such deficiencies and provide a system that includes a traffic flow tracking process and a mechanism for exporting interface/link and label mapping information. The traffic flow tracking process provides the capability for edge routers (or any other routers in the MPLS network) to export label binding information. This allows for the collection of flow data based on those bindings (either at that same device, or at any other device along the label switched path, including the ingress and egress). The traffic flow tracking process also provides a mechanism and algorithm for importing and processing this distributed information on collector devices, for example a Netflow collector. The traffic flow tracking process provides an algorithm whereby a device can export its label bindings to a collector. The following three records are defined to export the data from a router for this purpose.

1) PAL (Prefix, Application, Label) Record Type 1:
For each Label Forwarding Information Base (LFIB) record owned by an application that imposes an MPLS label, a router exports the following record format using the Netflow v9 record format. These records can be exported from any point along the LSP (i.e.: the imposition PE).
Record structure:
<direction, FEC, VPNid, LocalLabel, TableId, LabelStack, nextHop IP address, Local
LabelOwner, timestamp>
direction—indicates imposition/disposition
VPNid—IEEE VPNid (globally unique)
tableId—externally viewable table ID from IOS/IOX
nextHop IP address
Local LabelOwner—Application ID (i.e.: LDP)
timestamp—NTP synchronized time 2) PAL Record Type 2:
The local interface table must also be exported, as a means of pin-pointing the exporting LSR and which interface it was using for that particular flow, as well as in aiding the collector's correlation of an exported LFIB record with the traffic data export blocks. The format is specified as follows:
Record structure:
<router ID, InterfaceIpAddress, Interface Index, interfaceName>

3) Netflow Record Type (This is a New Record Type):
The following record format is exported to the collector from the point of traffic data collection. The record format can be collected at any point starting where the LFIB information is exported along the LSP path up to, and including the egress point.
Record structure:
<Label Stack, FEC, Source Interface>
The record is exported periodically by the routers to one or more collectors.

At the collector, the records are received. The traffic flow tracking process matches the netflow record's label stack with PAL record type 1. If a tie between the netflow record's label stack and the label stack parameter within the PAL record type 1 exists, the traffic flow tracking process uses the NextHop Address field. This returns the VPNId. If a tie exists with the NextHop Address field, the traffic flow tracking process tries imposition, then disposition. The NextHop Address field provides the direction of the flow of traffic through the network.

Embodiments disclosed herein include a computer system executing a traffic flow tracking process. The traffic flow tracking process receiving a packet at a router, and pushes one or more labels onto a label stack. The label stack is associated with the packet. The traffic flow tracking process provides a forwarding record containing label bindings for the router, and then transmits the forwarding record to a collector. At the collector, the traffic flow tracking process receives a record from a router, and compares a first record entry type of the record with a second record entry type of the record to determine the traffic flow in the network. The traffic flow tracking process maps the traffic flow in the network, based on a result of the comparing the first record entry type of the record with the second record entry type of the record.

During an example operation of one embodiment, suppose an edge router in a network receives a packet. The traffic flow tracking process pushes a label onto a label stack that is associated with the packet. The traffic flow tracking process then provides a forwarding record containing label bindings for the router to a collector. The traffic flow tracking process, at the collector, receives the forwarding record including at least one of a label stack, forward equivalency class identifier, source interface identifier and a local interface table. In an example embodiment, the collector receives a first packet from a first router with a label stack of {26|26}. The first packet is originating from the first router toward a second router. The collector also receives a second packet from the second router with a label stack of {26|26}. The second packet is originating from the second router toward the first router. The traffic flow tracking process at the collector uses the NextHop address to differentiate the first packet (originating from the first router toward the second router) from the second packet (originating from the second router toward the first router).

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when the traffic flow tracking process provides a second forwarding record, containing label binding for a second router, to the collector, the second forwarding record provided by the second router, the second router in communication with the first router, according to one embodiment disclosed herein.

FIG. 5 illustrates a flowchart of a procedure performed by the system of FIG. 1 when the traffic flow tracking process compares a first record entry type of the forwarding record with a second record entry type of the forwarding record to determine the traffic flow in the network, according to one embodiment disclosed herein.

FIG. 6 illustrates a flowchart of a procedure performed by the system of FIG. 1 when the traffic flow tracking process maps the traffic flow in the network and convolves the first record entry type and the second record entry type, according to one embodiment disclosed herein.

FIG. 8 illustrates a flowchart of a procedure performed by the system of FIG. 1 when the traffic flow tracking process maps a traffic flow of at least one router within the network, according to one embodiment disclosed herein.

DETAILED DESCRIPTION

Embodiments disclosed herein provide a system that includes a traffic flow tracking process that provides the capability for edge routers (or any other routers in the MPLS network) to export label binding information. This allows for the collection of flow data based on those bindings (either at that same device, or at any other device along the label switched path, including the ingress and egress routers). The traffic flow tracking process also provides a mechanism and algorithm for importing and processing this distributed information on Netflow collector devices. The traffic flow tracking process provides a technique whereby a device can export its label bindings to a collector. The record is exported periodically by the routers to one or more collectors.

At the collector, the records are received. The traffic flow tracking process matches the netflow record's label stack with PAL record type 1. If a tie between the netflow record's label stack and the label stack parameter within the PAL record type 1 exists, the traffic flow tracking process uses the NextHop Address field. This returns the VPNId. If a tie exists with the NextHop Address field, the traffic flow tracking process tries imposition, then disposition. (A dynamic MPLS tunnel is configured to enable label imposition and disposition of encapsulated ATM SDUs transported between two edge routers having a Label Distribution Protocol (LDP) neighbor relationship) The NextHop Address field provides the direction of the flow of traffic through the network.

Embodiments disclosed herein include a computer system executing a traffic flow tracking process. The traffic flow tracking process receiving a packet at a router, and pushes one or more labels onto a label stack. The label stack is associated with the packet. The traffic flow tracking process provides a forwarding record containing label bindings for the router, and then transmits the forwarding record to a collector. At the collector, the traffic flow tracking process receives a record from a router, and compares a first record entry type of the record with a second record entry type of the record to determine the traffic flow in the network. The traffic flow tracking process maps the traffic flow in the network, based on a result of the comparing the first record entry type of the record with the second record entry type of the record.

Figure 1:
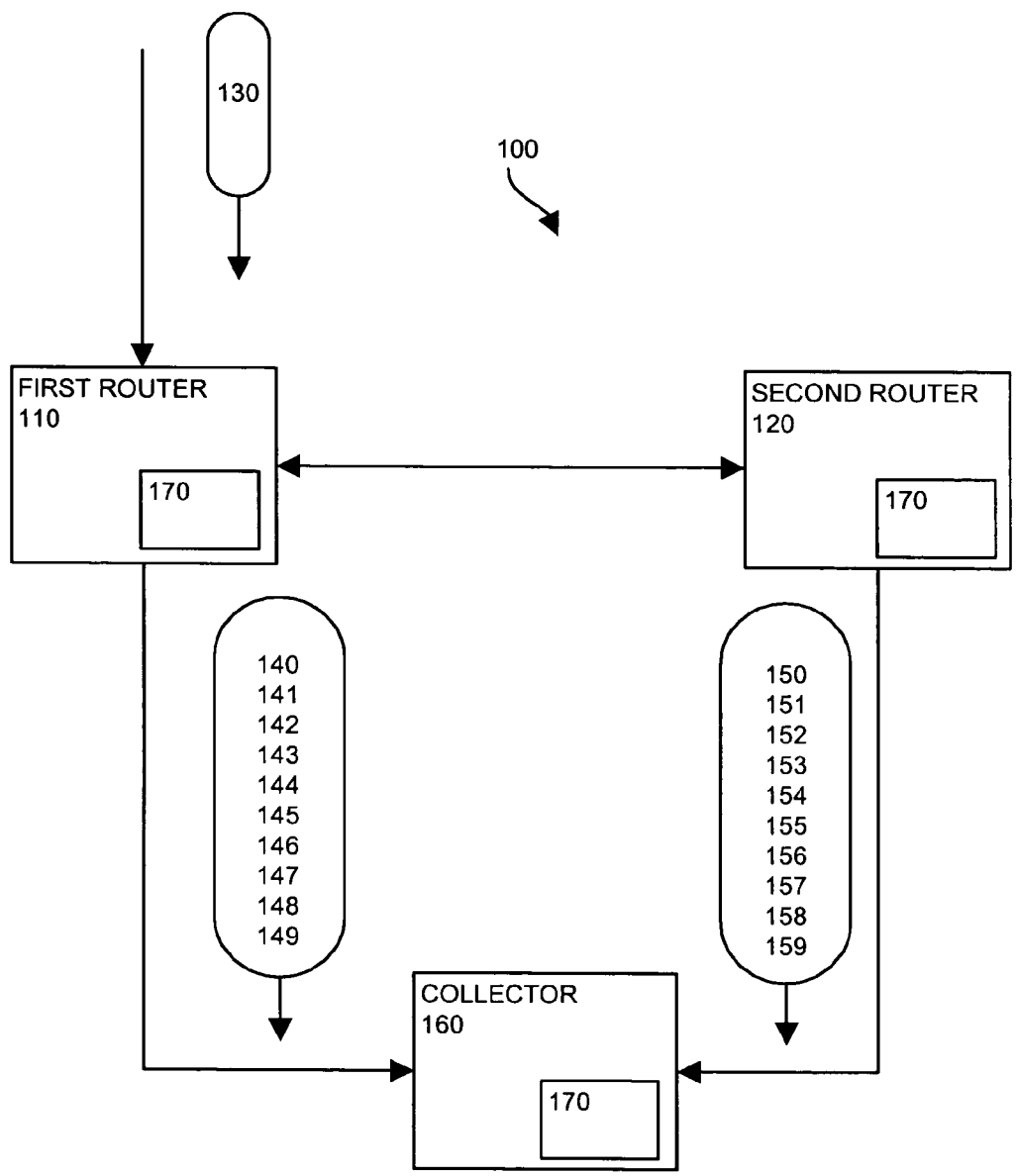
FIG. 1 illustrates an example configuration of a network environment that includes a security system configured as disclosed herein.

FIG. 1 illustrates an example computer networking environment 100 suitable for use in explaining example embodiments disclosed herein. The computer networking environment 100 includes a first router 110 in communication with a second router 120. An instance of the traffic flow tracking process 170 resides on each of the first router 110, the second router 120 and a collector 160. The collector 160 is in communication with both the first router 110 and the second router 120. The first router 110 receives a packet 130, and transmits a first forwarding record 140 to the collector 160. The first forwarding record 140 includes a first record entry type 141, second record entry type 146, and timestamp 145. The first record entry type 141 contains a first data field of the first record entry type 142, second data field of the first record entry type 143, and third data field of the first record entry type 144. The second record entry type 146 contains a first data field of the second record entry type 147, second data field of the second record entry type 148, and third data field of the second record entry type 149. The second forwarding record 150 includes a first record entry type 151, second record entry type 156, and timestamp 155. The first record entry type 151 contains a first data field of the first record entry type 152, second data field of the first record entry type 153, and third data field of the first record entry type 154. The second record entry type 156 contains a first data field of the second record entry type 157, second data field of the second record entry type 158, and third data field of the second record entry type 159. The traffic flow tracking process 170, at the collector 160, receives the first forwarding record 140 and second forwarding record 150, and compares the two to determine the traffic flow of the computer networking environment 100.

The traffic flow tracking process 170 may be embodied as software code such as data and/or logic instructions (e.g., code stored in the memory or on another computer readable medium such as a removable disk) that supports processing functionality according to different embodiments described herein.

It is noted that example configurations disclosed herein include the traffic flow tracking process 170 itself (i.e., in the form of un-executed or non-performing logic instructions and/or data). The traffic flow tracking process 170 may be stored as an application on a computer readable medium (such as a floppy disk), hard disk, electronic, magnetic, optical, or other computer readable medium. The traffic flow tracking process 170 may also be stored in a memory system such as in firmware, read only memory (ROM), or, as in this example, as executable code in, for example, Random Access Memory (RAM). Those skilled in the art will understand that the first router 110, the second router 120 and a collector 160 may include other processes and/or software and hardware components, such as an operating system not shown in this example.

Further details of configurations explained herein will now be provided with respect to a flow chart of processing steps that show the high level operations disclosed herein. Unless otherwise stated, the steps described below are unordered meaning that, when possible, the steps can be performed in any convenient or desirable order.

Figure 2:
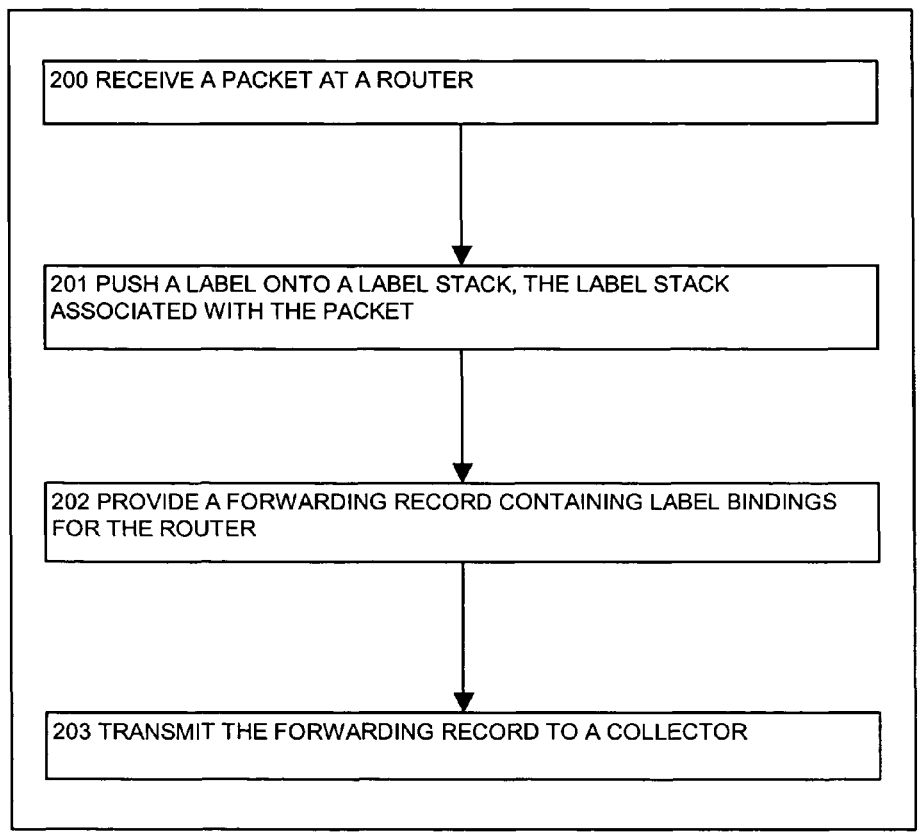
FIG. 2 illustrates a flowchart of a procedure performed by the system of FIG. 1 when the traffic flow tracking process receives a packet at a router, according to one embodiment disclosed herein.

FIG. 2 is a flowchart of the steps performed by the traffic flow tracking process 170 when it receives a packet 130 at a router.

In step 200, the traffic flow tracking process 170 receives a packet 130 at a router. In an example embodiment, the computer networking environment 100 is comprised of a plurality of routers in communication with each other. For example the first router 110 is in communication with the second router 120. In this scenario, a packet 130 is received at the first router 110. Thus, the traffic flow tracking process 170 receives a packet 130 at the first router 110.

In step 201, the traffic flow tracking process 170 pushes a label onto a label stack, the label stack associated with the packet 130. In an example configuration, in an MPLS-network, incoming packets are assigned a label by a so-called LER (Label Edge Router) receiving the incoming packets. The packets in the MPLS network are forwarded along a predefined Label Switch Path (LSP) defined in the MPLS network based, at least initially, on the label provided by a respective LER. At internal nodes of the MPLS-network, the packets are forwarded along a predefined LSP through so-called Label Switch Routers. LDP (Label Distribution Protocol) is used to distribute appropriate labels for label-switching purposes.

Each Label Switching Router (LSR) in an LSP between respective LERs in an MPLS-type network makes forwarding decisions based solely on a label of a corresponding packet. Depending on the circumstances, a packet may need to travel through many LSRs along a respective path between LERs of the MPLS-network. As a packet travels through a label-switching network, each LSR along an LSP strips off an existing label associated with a given packet and applies a new label to the given packet prior to forwarding to the next LSR in the LSP. The new label informs the next router in the path how to further forward the packet to a downstream node in the MPLS network eventually to a downstream LER that can properly forward the packet to a destination. Thus, the first router 110 receives a packet 130 and pushes a label onto a label stack.

In step 202, the traffic flow tracking process 170 provides a first forwarding record 140 containing label bindings for the router 110. In an example configuration, the traffic flow tracking process 170 defines three record types, a PAL record type 1, a PAL record type 2, and a Netflow record type.

1) PAL Record Type 1:
For each LFIB record owned by an application that imposes an MPLS label, a router exports the following record format using the Netflow v9 record format. These records can be exported from any point along the LSP (i.e.: the imposition PE).
Record structure:
<direction, FEC, VPNid, LocalLabel, TableId, LabelStack, nextHop IP address, Local
LabelOwner, timestamp>
direction—indicates imposition/disposition
VPNid—IEEE VPNid (globally unique)
tableId—externally viewable table ID from IOS/IOX
nextHop IP address
Local LabelOwner—Application ID (i.e.: LDP)
timestamp—NTP synchronized time 2) PAL Record Type 2:
The local interface table must also be exported, as a means of pin-pointing the exporting LSR and which interface it was using, as well as in aiding the collector's correlation of an exported LFIB record with the traffic data export blocks. The format is specified as follows:
Record structure:
<router ID, InterfaceIpAddress, Interface Index,interfaceName>

3) Netflow Record Type (This is a New Record Type):
The following record format is exported to the collector from the point of traffic data collection. The record format can be collected at any point starting where the LFIB information is exported along the LSP path up to, and including the egress point.
Record structure
<Label Stack, FEC, Source Interface>
The three record types are contained within the first forwarding record 140 provided by the traffic flow tracking process 170 residing on the first router 110.

In step 203, the traffic flow tracking process 170 transmits the forwarding record 140 to a collector 160. In an example configuration, the traffic flow tracking process 170, residing on the first router 110, exports the first forwarding record 140 to the collector 160.

FIG. 3 is a flowchart of the steps performed by the traffic flow tracking process 170 when it provides a second forwarding record 150, containing label binding for a second router 120, to the collector 160, the second forwarding record 150 provided by the second router 120, the second router 120 in communication with the first router 110.

In step 204, the traffic flow tracking process 170 provides a second forwarding record 150, containing label binding for a second router 120, to the collector 160, the second forwarding record 150 provided by the second router 120, the second router 120 in communication with the first router 110. In an example configuration, the computer networking environment 100 is comprised of a plurality of routers in communication with each other. For example, the first router 110 is in communication with the second router 120. The first router 110 provides a first forwarding record (containing label binding) 140 to the collector 160. The second router 120 provides a second forwarding record (containing label binding) 150 to the collector 160. In an example configuration, the second router 120 receives a packet (not shown) and pushes a label onto a label stack. The second router 120 then provides a second forwarding record 150 (containing label bindings for the second router 120), and transmits the second forwarding record 150 to the collector 160.

In step 205, the traffic flow tracking process 170 determines the second forwarding record 150 provided by the second router 120 contains information not included in the first forwarding record 140 provided by the first router 110. In an example configuration, the computer networking environment 100 is comprised of the first router 110, acting as an edge router (i.e., Provider Edge) and the second router 120 (acting as a Provider router). The first router 110 exports (to the collector 160) control plane-related records (i.e., PAL record type 1, PAL record type 2 and Netflow record). The first router 110 does not export the netflow data records from its data plane statistics. The second router 120 exports (to the collector 160) control plane-related records (i.e., PAL record type 1, PAL record type 2 and Netflow record). The second router 120 exports the netflow data records from its data plane statistics. Thus, the traffic flow tracking process 170 determines the second forwarding record 150 provided by the second router 120 contains information (i.e., the data plane statistics) not included in the first forwarding record 140 provided by the first router 110.

Alternatively, in step 206, the traffic flow tracking process 170 determines the second forwarding record 150 provided by the second router 120 includes information included in the first forwarding record 140 provided by the first router 110. In an example configuration, the computer networking environment 100 is comprised of the first router 110, acting as an edge router (i.e., a Provider Edge router) and the second router 120, also acting as an edge router (i.e., a Provider Edge router). The first router 110 exports (to the collector 160) control plane-related records (i.e., PAL record type 1, PAL record type 2 and Netflow record). The first router 110 exports the netflow data records from its data plane statistics. The second router 120 exports (to the collector 160) control plane-related records (i.e., PAL record type 1, PAL record type 2 and Netflow record). The second router 120, not knowing that the first router 110, acting as a PE router, has exported the netflow data records to the collector 160, also exports the netflow data records from its (i.e., the second router 120) data plane statistics. Thus, the traffic flow tracking process 170 determines the second forwarding record 150 provided by the second router 120 includes information included in the first forwarding record 140 provided by the first router 110.

Figure 4:
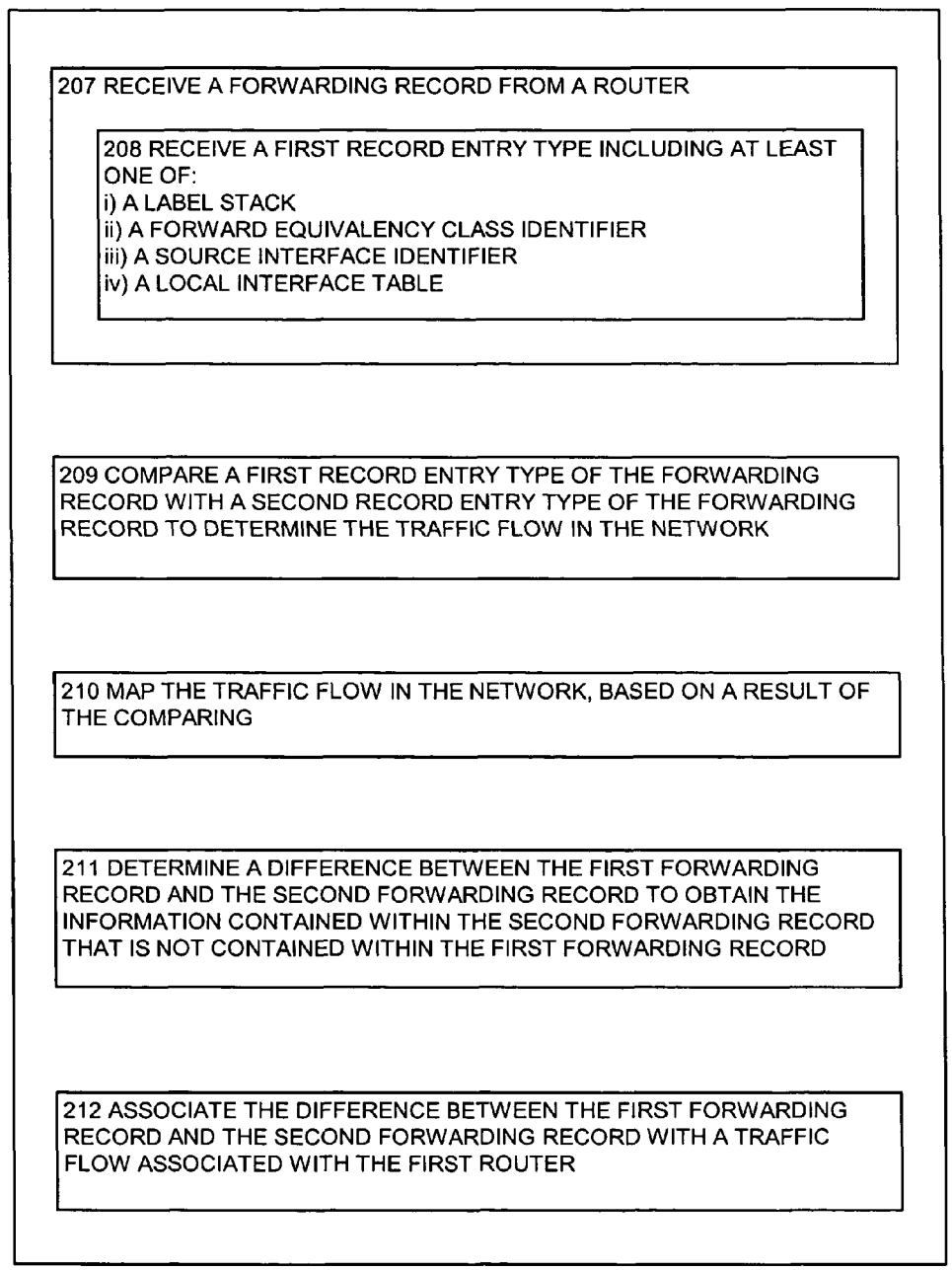
FIG. 4 illustrates a flowchart of a procedure performed by the system of FIG. 1 when the traffic flow tracking process receives a forwarding record from a router, according to one embodiment disclosed herein.

FIG. 4 is a flowchart of the steps performed by the traffic flow tracking process 170, residing on the collector 160, when it receives a forwarding record 140 from a router 110.

In step 207, the traffic flow tracking process 170, residing on the collector 160, receives a forwarding record 140 from a router 110. In an example configuration, the first router 110 receives a packet 130 and pushes a label onto a label stack. The first router 110 then provides a first forwarding record 140 (containing label bindings for the first router 110), and transmits the first forwarding record 140 to the collector 160. Thus, the traffic flow tracking process 170, residing on the collector 160, receives a first forwarding record 140 from a first router 110.

In step 208, the traffic flow tracking process 170, residing on the collector 160, receives a first record entry type 141 including at least one of:
i) a label stack
ii) a forward equivalency class identifier
iii) a source interface identifier and
iv) a local interface table.

In step 209, the traffic flow tracking process 170, residing on the collector 160, compares a first record entry type 141 of the first forwarding record 140 with a second record entry type 146 of the first forwarding record 140 to determine the traffic flow in the computer networking environment 100. In an example configuration, the traffic flow tracking process 170, residing on the collector 160 receives a first forwarding record 140 from the first router 110. The first forwarding record 140 contains a first record type 141, such as a netflow record's label stack, and a second record type 146, such as a PAL record type 1. The traffic flow tracking process 170, residing on the collector 160, compares a first record entry type 141 (i.e., the netflow record's label stack) of the first forwarding record 140 with a second record entry type 146 (i.e., the PAL record type 1) of the first forwarding record 140 to determine the traffic flow in the computer networking environment 100.

In step 210, the traffic flow tracking process 170, residing on the collector 160, maps the traffic flow in the network (i.e., the computer networking environment 100), based on a result of the comparing. In an example configuration, the traffic flow tracking process 170, residing on the collector 160, compares a first record entry type 141 (i.e., the netflow record's label stack) of the first forwarding record 140 with a second record entry type 146 (i.e., the PAL record type 1) of the first forwarding record 140. Based on the result of the comparison, the traffic flow tracking process 170 maps the traffic flow in the network (i.e., the computer networking environment 100). In an example configuration, this mapping is used to determine from where traffic in the network (i.e., the computer networking environment 100) is originating to assess capacity of various devices (i.e., routers) within the network. For example, mapping the traffic flow could reveal a particular provider edge router is saturated, thereby necessitating additional resources on that network. This mapping can also be used to determine, for example, if a customer has exceeded the network capacity for which the customer has paid.

In step 211, the traffic flow tracking process 170, residing on the collector 160, determines a difference between the first forwarding record 140 and the second forwarding record 150 to obtain the information contained within the second forwarding record 150 that is not contained within the first forwarding record 140. In an example configuration, the computer networking environment 100 is comprised of the first router 110, acting as an edge router (i.e., Provider Edge router) and the second router 120 (acting as a Provider router). The first router 110 provides a first forwarding record 140 to the collector 160, and the second router 120 provides a second forwarding record 150 to the collector 160. The first router 110 exports (to the collector 160) control plane-related records (i.e., PAL record type 1, PAL record type 2 and Netflow record). The first router 110 does not export the netflow data records from its data plane statistics. The second router 120 exports (to the collector 160) control plane-related records (i.e., PAL record type 1, PAL record type 2 and Netflow record). The second router 120 exports the netflow data records from its data plane statistics. Thus, the traffic flow tracking process 170, residing on the collector 160, determines a difference between the first forwarding record 140 and the second forwarding record 150 to obtain the information (i.e., the data plane statistics) contained within the second forwarding record 150 that is not contained within the first forwarding record 140.

In step 212, the traffic flow tracking process 170, residing on the collector 160, associates the difference between the first forwarding record 140 and the second forwarding record 150 with a traffic flow associated with the first router 110. In an example configuration, the traffic flow tracking process 170 determines a direction of the flow of traffic on the network based on the difference between the first forwarding record 140 and the second forwarding record 150.

FIG. 5 is a flowchart of the steps performed by the traffic flow tracking process 170, residing on the collector 160, when it compares a first record entry type 141 of the first forwarding record 140 with a second record entry type 146 of the first forwarding record 140 to determine the traffic flow in the computer networking environment 100

In step 213, the traffic flow tracking process 170, residing on the collector 160, compares a first record entry type 141 of the first forwarding record 140 with a second record entry type 146 of the first forwarding record 140 to determine the traffic flow in the computer networking environment 100. In an example configuration, the traffic flow tracking process 170, residing on the collector 160 receives a first forwarding record 140 from the first router 110. The first forwarding record 140 contains a first record type 141, such as a netflow record's label stack, and a second record type 146, such as a PAL record type 1. The traffic flow tracking process 170, residing on the collector 160, compares a first record entry type 141 (i.e., the netflow record's label stack) of the first forwarding record 140 with a second record entry type 146 (i.e., the PAL record type 1) of the first forwarding record 140 to determine the traffic flow in the computer networking environment 100.

In step 214, the traffic flow tracking process 170, residing on the collector 160, compares a first data field 142 of the first record entry type 141 with a first data field 147 of the second record entry type 146. In an example configuration, the traffic flow tracking process 170, residing on the collector 160 compares the new netflow records' label stack (i.e., the first data field 142 of the first record entry type 141) with PAL record Type 1 (i.e., the first data field 147 of the second record entry type 146).

In step 215, the traffic flow tracking process 170, residing on the collector 160, determines the first data field 142 of the first record entry type 141 matches with a first data field 147 of the second record entry type 146. In an example configuration, the traffic flow tracking process 170, residing on the collector 160 compares the new netflow records' label stack (i.e., the first data field 142 of the first record entry type 141) with PAL record Type 1 (i.e., the first data field 147 of the second record entry type 146). The traffic flow tracking process 170, residing on the collector 160 determines there is a tie between the new netflow records' label stack (i.e., the first data field 142 of the first record entry type 141) and PAL record Type 1 (i.e., the first data field 147 of the second record entry type 146).

In step 216, the traffic flow tracking process 170, residing on the collector 160, uses a second data field 148 of the second record entry type 146 to determine an identifier associated with a virtual private network. In an example configuration, the traffic flow tracking process 170, residing on the collector 160, uses a NextHop Address field (i.e., the second data field 148 of the second record entry type 146) to determine the VPNId.

Alternatively, in step 217, the traffic flow tracking process 170, residing on the collector 160, use a third data field 149 of the second record entry type 146 to determine a direction in which a packet 130 associated with the router 110 is traveling. In an example configuration, the traffic flow tracking process 170, residing on the collector 160, tries imposition PAL records, then disposition PAL records to determine the direction in which the packet 130 was traveling.

FIG. 6 is a flowchart of the steps performed by the traffic flow tracking process 170, residing on the collector 160, when it maps the traffic flow in the network (i.e., the computer networking environment 100).

In step 218, the traffic flow tracking process 170, residing on the collector 160, maps the traffic flow in the network (i.e., the computer networking environment 100), based on a result of the comparing. In an example configuration, the traffic flow tracking process 170, residing on the collector 160, compares a first record entry type 141 (i.e., the netflow record's label stack) of the first forwarding record 140 with a second record entry type 146 (i.e., the PAL record type 1) of the first forwarding record 140. Based on the result of the comparison, the traffic flow tracking process 170 maps the traffic flow in the network (i.e., the computer networking environment 100). In an example configuration, this mapping is used to determine from where traffic in the network (i.e., the computer networking environment 100) is originating to assess capacity of various devices (i.e., routers) within the network (i.e., the computer networking environment 100). This mapping can also be used to determine, for example, if a customer has exceeded the network capacity for which the customer has paid.

In step 219, the traffic flow tracking process 170, residing on the collector 160, determines a sequence of the traffic flow on the network (i.e., the computer networking environment 100) based on at least one data field (i.e., a first data field 142 of the first record entry type 141) in the first record entry type 141 in conjunction with at least one data field (i.e., a first data field 147 of the first record entry type 141) from the second record entry type 146. In an example configuration, the traffic flow tracking process 170, residing on the collector 160, uses a NextHop Address field (i.e., the first data field 142 of the first record entry type 141) and a NextHop Address field (i.e., the first data field 147 of the first record entry type 146) to determine the sequence of traffic flow on the network.

In step 220, the traffic flow tracking process 170, residing on the collector 160, integrates the first record entry type 141 and the second record entry type 156 into the sequence based on the time stamp 145 associated with the first record entry type 141 and the time stamp 155 associated with the second record entry type 156. In an example configuration, the first router 110 exports a first record entry type 141, and the second router 120 exports a second record entry type 156. The first record entry type 141 has an associated time stamp 145. The second record entry type 156 has an associated time stamp 155. The traffic flow tracking process 170, residing on the collector 160, integrates the first record entry type 141 and the second record entry type 156 into the sequence based on the time stamp 145 associated with the first record entry type 141 and the time stamp 155 associated with the second record entry type 156.

Figure 7:
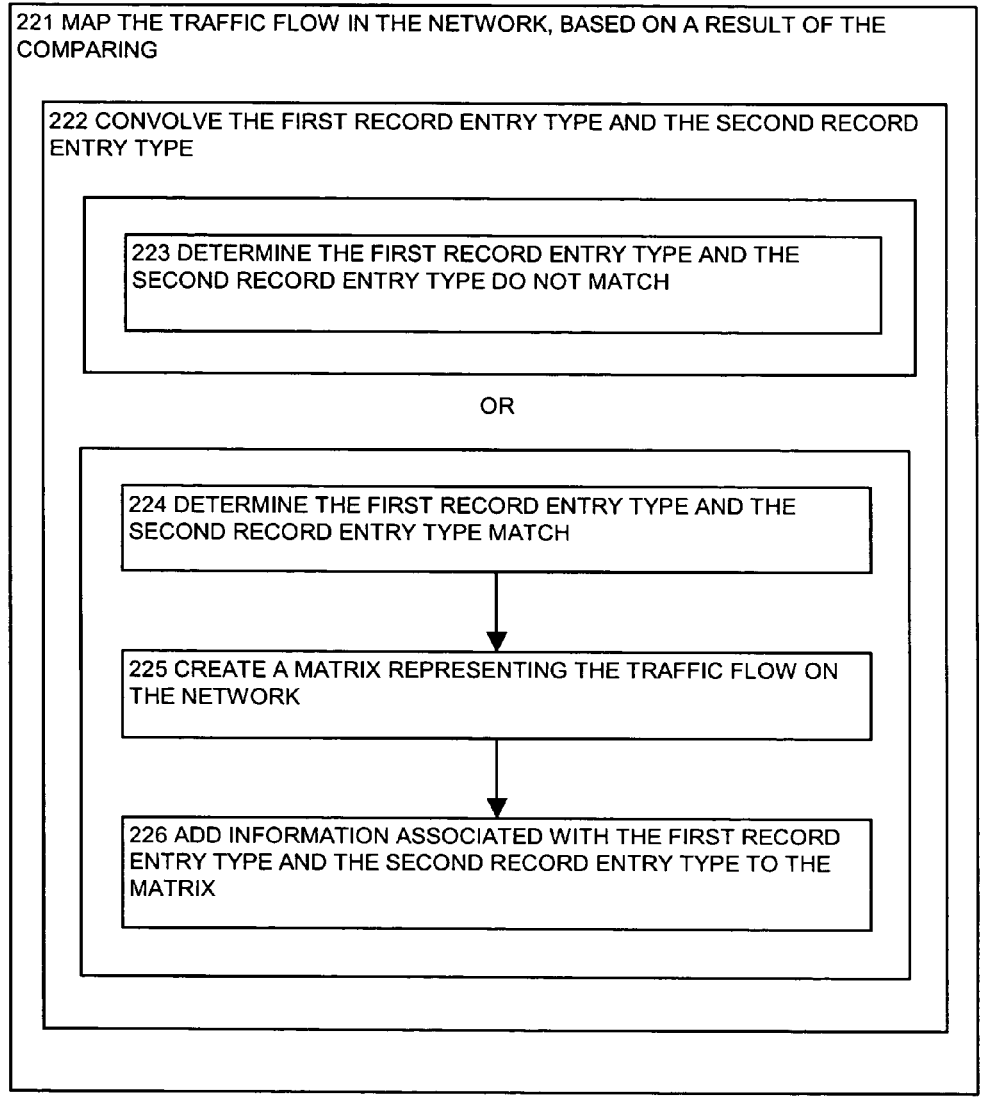
FIG. 7 illustrates a flowchart of a procedure performed by the system of FIG. 1 when the traffic flow tracking process map the traffic flow in the network, according to one embodiment disclosed herein.

FIG. 7 is a flowchart of the steps performed by the traffic flow tracking process 170, residing on the collector 160, when it maps the traffic flow in the network (i.e., the computer networking environment 100).

In step 221, the traffic flow tracking process 170, residing on the collector 160, maps the traffic flow in the network (i.e., the computer networking environment 100), based on a result of the comparing. In an example configuration, the traffic flow tracking process 170, residing on the collector 160, compares a first record entry type 141 (i.e., the netflow record's label stack) of the first forwarding record 140 with a second record entry type 146 (i.e., the PAL record type 1) of the first forwarding record 140. Based on the result of the comparison, the traffic flow tracking process 170 maps the traffic flow in the network (i.e., the computer networking environment 100). In an example configuration, this mapping is used to determine from where traffic in the network is originating to assess capacity of various devices (i.e., routers) within the network (i.e., the computer networking environment 100). This mapping can also be used to determine, for example, if a customer has exceeded the network capacity for which the customer has paid.

In step 222, the traffic flow tracking process 170, residing on the collector 160, convolves the first record entry type 141 and the second record entry type 156. In an example configuration, traffic flow tracking process 170, residing on the collector 160 convolves the first record entry type 141 and the second record entry type 156 by, for example, sliding two functions F(x) & G(x) across each other, multiplying them together at each step, at each "dx", and then adding the results together.

In step 223, the traffic flow tracking process 170, residing on the collector 160, determines the first record entry type 141 and the second record entry type 156 do not match. In an example configuration, the traffic flow tracking process 170, residing on the collector 160 determines the first record entry type 141 and the second record entry type 156 do not match, and adds no information to a matrix that corresponds to the traffic flow on the network.

Alternatively, in step 224, the traffic flow tracking process 170, residing on the collector 160, determines the first record entry type 141 and the second record entry type 156 match. In an example configuration, the traffic flow tracking process 170, residing on the collector 160 convolves the first record entry type 141 and the second record entry type 156, and determines there exists a match between the first record entry type 141 and the second record entry type 156.

In step 225, the traffic flow tracking process 170, residing on the collector 160, creates a matrix representing the traffic flow on the network. In an example configuration, the traffic flow tracking process 170, residing on the collector 160, creates a matrix on which to map the traffic flow on the network.

In step 226, the traffic flow tracking process 170, residing on the collector 160, adds information associated with the first record entry type 141 and the second record entry type 156 to the matrix. In an example configuration, the traffic flow tracking process 170, residing on the collector 160 convolves the first record entry type 141 and the second record entry type 156, and determines there exists a match between the first record entry type 141 and the second record entry type 156. The traffic flow tracking process 170, residing on the collector 160, creates a matrix on which to map the traffic flow on the network, and adds information associated with the first record entry type 141 and the second record entry type 156 to the matrix.

FIG. 7 is a flowchart of the steps performed by the traffic flow tracking process 170, residing on the collector 160, when it maps the traffic flow in the network (i.e., the computer networking environment 100).

In step 227, the traffic flow tracking process 170, residing on the collector 160, maps the traffic flow in the network (i.e., the computer networking environment 100), based on a result of the comparing. In an example configuration, the traffic flow tracking process 170, residing on the collector 160, compares a first record entry type 141 (i.e., the netflow record's label stack) of the first forwarding record 140 with a second record entry type 146 (i.e., the PAL record type 1) of the first forwarding record 140. Based on the result of the comparison, the traffic flow tracking process 170 maps the traffic flow in the network (i.e., the computer networking environment 100). In an example configuration, this mapping is used to determine from where traffic in the network is originating to assess capacity of various devices (i.e., routers) within the network. This mapping can also be used to determine, for example, if a customer has exceeded the network capacity for which the customer has paid.

In step 228, the traffic flow tracking process 170, residing on the collector 160, maps a traffic flow of at least one router within the network. In an example configuration, the traffic flow tracking process 170, residing on the collector 160, maps the traffic flow of the first router 110. In another example configuration, the traffic flow tracking process 170, residing on the collector 160 maps the traffic flow of the first router 110, and the second router 120.

In step 229, the traffic flow tracking process 170, residing on the collector 160, maps a traffic flow of at least one virtual routing and forwarding table within the network. In an example configuration, the traffic flow tracking process 170, residing on the collector 160, map a traffic flow of the VRF table associated with the first router 110.

While the system and method have been particularly shown and described with references to configurations thereof, it will be understood by those skilled in the art that various changes in form and details may be made therein without departing from the scope of embodiments disclosed herein encompassed by the appended claims. Accordingly, the present embodiments disclosed herein are not intended to be limited by the example configurations provided above.

What is claimed is:

1. A method of tracking a traffic flow in a network of label switch routers, the method comprising:
receiving at least one control plane-related record at a collector device from a first router, the at least one control plane-related record including a label binding of the first router, the label binding of the first router including a first label stack, a label local to the first router, and a next hop network address exported from a Label Forwarding Information Base (LFIB) record stored in the first router, the collector device not receiving any data plane statistics accumulated at the first router;
receiving at least one data plane-related record at the collector device from a second router, the at least one data plane-related record including label aggregated traffic data accumulated at the second router in addition to a corresponding second label stack and a corresponding source interface exported from the second router;
determining, at the collector device, how Multi-protocol Label Switching (MPLS) traffic is configured to flow between the first router and the second router by comparing, at the collector device, the label binding of the first router with the second label stack and the source interface exported from the second router; and
determining data plane statistics for the first router at the collector device based on the label aggregated traffic data accumulated at the second router and on how the MPLS traffic is configured to flow between the first router and the second router.

2. The method of claim 1, wherein exporting the at least one control plane-related record comprises exporting the at least one control plane-related record at the first router but not exporting, at the first router, any data plane statistics accumulated in the first router.

3. The method of claim 1, further comprising exporting each Label Forwarding Information Base (LFIB) record, from the first router, that is owned by an application imposing an MPLS label.

4. The method of claim 1, wherein determining how MPLS traffic is configured to flow between the first router and the second router comprises determining a direction of flow of at least one packet.

5. The method of claim 1, wherein the label binding of the first router further comprises a forward equivalency class identifier and a source interface identifier.

6. A method of tracking traffic flow in a network of label switch routers, the method comprising:
determining aggregated data plane statistics for a first router at a collector device by:

receiving a first forwarding record at the collector device from the first router, the first forwarding record including label bindings of the first router, the label bindings of the first router including a first label stack, a label local to the first router, and a next hop network address exported from a Label Forwarding Information Base (LFIB) record stored in the first router, the collector device not receiving any data plane statistics accumulated at the first router;

receiving a second forwarding record at the collector device from a second router, the second forwarding record including label aggregated traffic data aggregated at the second router, the second forwarding record further including a second label stack and a source interface associated with a plurality of Label Switch Path (LSP) packets received at the second router;

determining at the collector device whether any of the LSP packets flowed from the first router to the second router by comparing the label bindings of the first router with the second label stack and the source interface; and determining the aggregated data plane statistics for the first router at the collector device based on the determination of whether any of the LSP packets flowed from the first router to the second router and based on traffic data aggregated for an LSP label at the second router, the second forwarding record including the traffic data aggregated for the LSP label at the second router.

7. The method of claim 6, further comprising mapping a traffic flow of a Virtual Private Routing and Forwarding (VRF) table associated with the first router by determining a difference between the first forwarding record received from the first router and the second forwarding record received from the second router.

8. The method of claim 6, further comprising receiving, in the label bindings of the first router, a Virtual Private Network identifier for each LFIB stored in the first router.

9. A computerized device comprising:
a memory;
a processor;
a communications interface;
an interconnection coupling the memory, the processor and the communications interface, wherein the memory is encoded with a traffic flow tracking application that when executed on the processor is executable to determine data plane statistics for a first router by performing the operations of:
receiving at least one control plane-related record at a collector device from a first router, the at least one control plane-related record comprising a label binding of the first router, the label binding of the first router including a first label stack, a label local to the first router, and a next hop network address exported from a Label Forwarding Base (LFIB) record stored in the first router, without receiving, at the collector device, any data plane statistics accumulated at the first router;

receiving at least one data plane-related record at the collector device from a second router, the at least one data plane-related record comprising label aggregated traffic data accumulated at the second router in addition to a corresponding second label stack and a corresponding source interface exported from the second router;

determining, at the collector device, how Multi-protocol Label Switching (MPLS) traffic is configured to flow between the first router and the second router by comparing, at the collector device, the label binding of the first router with the second label stack and the source interface exported from the second router; and determining the data plane statistics for the first router at the collector device based on the label aggregated traffic data accumulated at the second router and on how the MPLS traffic is configured to flow between the first router and the second router.

10. A tangible non-transitory computer readable medium encoded with computer programming logic that, when executed on a process in a computerized device, determines traffic flow in a network of label switch routers, the tangible computer readable medium comprising:
instructions executable to receive at least one control plane-related record at a collector device from a first router, the at least one control plane-related record comprising a label binding of the first router, the label binding of the first router including a first label stack, a label local to the first router, and a next hog network address for each Label Forwarding Base (LFIB) record stored in the first router, without receiving, at the collector device, any data plane statistics accumulated at the first router;

instructions executable to receive at least one data plane-related record at the collector device from a second router, the at least one data plane-related record comprising label aggregated traffic data accumulated at the second router in addition to a corresponding second label stack and a corresponding source interface exported from the second router;

instructions executable to determine, at the collector device, how Multi-protocol Label Switching (MPLS) traffic is configured to flow between the first router and the second router, wherein the instructions executable to determine how MPLS traffic is configured to flow comprise instructions executable to compare, at the collector device, the label binding of the first router with the second label stack and the source interface exported from the second router; and instructions executable to determine data plane statistics for the first router at the collector device based on the label aggregated traffic data accumulated at the second router and on how the MPLS traffic is configured to flow between the first router and the second router.

* * * * *